Figure 1:
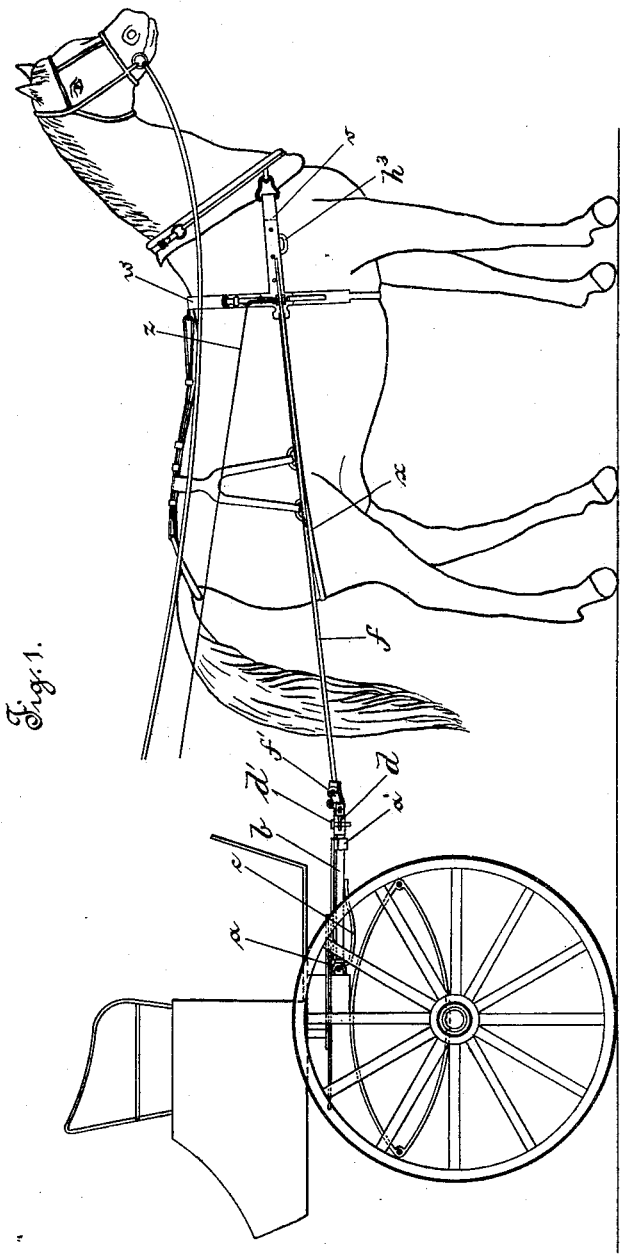

(No Model.) 3 Sheets—Sheet 1.

G. A. FRAAS.
VEHICLE SHAFTS.

No. 480,869. Patented Aug. 16, 1892.

Witnesses:

Inventor:
Gustav A. Fraas,
by William E. Coulter,
attorney

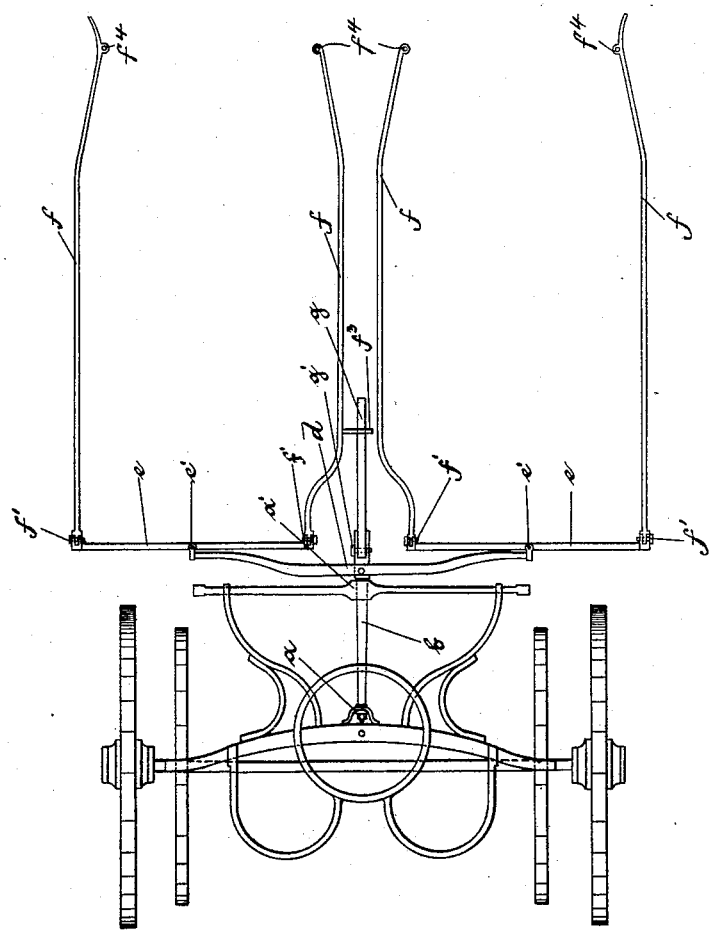

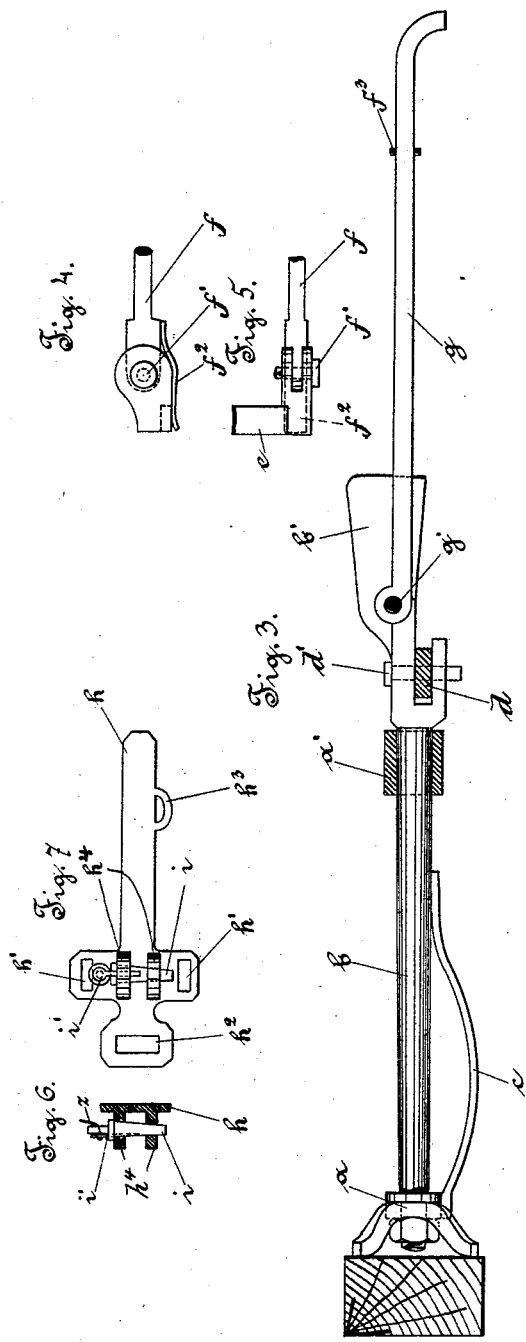

UNITED STATES PATENT OFFICE.

GUSTAV ADOLF FRAAS, OF DRESDEN, GERMANY.

VEHICLE-SHAFT.

SPECIFICATION forming part of Letters Patent No. 480,869, dated August 16, 1892.

Application filed July 3, 1891. Serial No. 398,356. (No model.)

*To all whom it may concern:*

Be it known that I, GUSTAV ADOLF FRAAS, a subject of the King of Saxony, residing at Dresden, Saxony, in the German Empire, have invented certain new and useful Improvements in Vehicles, of which the following is a specification.

My invention has relation to vehicles, and more particularly to the construction and arrangement of the poles and shafts thereof; and among the objects in view are to dispense with the ordinary pole and traces and provide a separate pair of shafts for each animal, said shafts being so attached as to have a vertical as well as a lateral movement independently of the vehicle, to thereby obviate danger of injury to the animals should the vehicle turn over; also, to provide a simple arrangement of shafts for vehicles; and the invention consists in the construction, arrangement, and combination of parts, all as hereinafter fully described, illustrated in the accompanying drawings, and pointed out in the appended claims.

In the accompanying drawings, Figure 1 is a side view of the improved harnessing device and the front portion of the carriage, the whole in operative position. Fig. 2 is a plan of the arrangement, and Figs. 3 to 7 are detail views hereinafter more fully referred to.

Upon the fore-carriage at $a$ $a'$ is arranged a spindle $b$, Figs. 1 to 3, in such a manner that, although capable of turning, it may not be shifted longitudinally. To prevent this spindle, however, from turning too readily, it is checked by the friction-spring $c$, resting against a flattened portion of the said spindle. Upon this spindle $b$ is mounted the whiffletree $d$, adapted to turn on the pivot $d'$. To the ends of this whiffletree are similarly pivoted the trees $e$ by means of pins or bolts $e'$. To the ends of the trees $e$ are pivoted at $f'$ the shafts $f$ in such a manner that they may rise or fall, as required, but are not capable of any lateral motion independently of the trees $e$. The heads of the shafts $f$ are provided with springs $f^2$, Fig. 4, which, having their free ends engaging with the under sides of the heads of the trees $e$, maintain the shafts $f$ in a horizontal position.

At its front end the spindle $b$ carries vertical lugs $b'$, between which is pivoted at $g'$ the rod $g$, so as to swing in a vertical plane. The steering-rod slides within the eye $f^3$, secured to the inner shaft of the near-side horse. If required, a similar eye may be provided on the inner shaft of the off-side horse as well and the rod $g$ slide in both. These eyes should be so proportioned, however, as to leave sufficient room for the rod $g$ to work therein in case of the whiffletree assuming an inclined position, and it is by them that any side movement the horses are caused by the driver to perform—say, when the carriage is to be turned—is transmitted to the steering-rod $g$. When the shafts are moved upward or downward, the said steering-rod $g$ will freely follow their movements without in the least interfering with the horses. The shafts are connected with the harnessing proper by the links or fittings $h$, Figs. 6 and 7, which are secured to the traces $v$ at the points where they meet the girth or belly-band $w$. The eyes $h'$, Fig. 7, arranged opposite to each other, serve for fastening the belly-band. To the eye $h^2$ is connected the strap $x$, whereby the horses are enabled to stop the carriage, when required, and to the eyes $h^3$ in four-horse carriages are hooked the traces of the leaders. The links or fittings $h$ also carry the lugs $h^4$, between which are inserted the eyes $f^4$ of the shafts $f$, a bolt $i$ in each completing the pivot-joint. These bolts or pivots $i$ are so constructed that while they remain securely enough in place during the motion of the carriage they may by one pull at a string connecting them with the driver's seat be unhooked, so that the horses are instantaneously unharnessed. For this purpose the bolts $i$ are provided each with a spring $i'$, having a projection which enters a recess or perforation in the upper of the lugs $h^4$, Fig. 6, by which arrangement the said bolts are prevented from slipping out accidentally. To the free end of each spring $i'$ is attached a cord $z$, which passes through a perforation in the head of the bolt $i$ and through suitable guiding rings or eyes provided along the harnessing, and finally joins the other cord, so that one common cord leads up to the driver's seat. When this cord is pulled, the spring $i'$, together with its projection, is caused to enter a groove or recess provided for the purpose in its bolt $i$, whereupon the bolt may be withdrawn from its lugs $h^4$ and the eyes $f^4$ of the shafts released, or, in other words, the connection between the horses and the carriage severed.

Although I have hereinbefore described and shown in detail in Figs. 6 and 7 the preferred means whereby my improved arrangement of shafts may be readily connected to the harness of the animals, yet I do not wish to claim said connecting means herein. I simply show and describe said means in this case for the reason that they are simple and for the further reason that some means are absolutely necessary for connecting my shafts to a harness. Any other means, however, than those described may be used for effecting the connection between the shafts and the harness.

It will be understood that the details of construction are susceptible of various modifications without departure from the principle of the invention.

I claim—

1. The combination, with a vehicle, of a longitudinal spindle $b$, pivoted to the vehicle, a whiffletree $d$, pivoted to said spindle, a rod $g$, pivoted to the latter, as described, trees $e$, pivoted to the ends of the whiffletree, shafts pivoted to said trees $e$, and an eye $f^3$, secured to one of the sections of the shafts and sliding upon the rod $g$, all arranged and combined for co-operation, substantially as for the purpose specified.

2. The combination, with the trees $e$, of the shafts $f$, provided with eyes $f^4$, and the fitting $h$, secured to a portion of the harness and provided with lugs $h^4$, between which fit the eyes $f^4$, all arranged and combined for co-operation, substantially as and for the purpose specified.

3. In apparatus such as described, the combination, with a fore-carriage, of a shaft capable of rotating on a horizontal axis, another shaft jointed to it, so that it may rock in a vertical plane, and a whiffletree jointed to it, so that it may rock in a horizontal plane, substantially as described, and illustrated in the accompanying drawings.

4. In apparatus such as described, the combination, with a fore-carriage, of a horizontal revoluble shaft, vertically-movable shaft pivoted to its front end, a whiffletree, two pairs of limbers or shafts, and an eye sliding on the vertically-movable shaft, substantially as described, and illustrated in the accompanying drawings.

5. In apparatus such as described, the combination, with a fore-carriage, of a horizontal revoluble shaft and a spring to bear frictionally against it, substantially as and for the purpose described, and illustrated in the accompanying drawings.

In testimony whereof I have hereto set my hand in the presence of the two subscribing witnesses.

GUSTAV ADOLF FRAAS.

Witnesses:
 OTTO WOLFF,
 H. DE SOTO.